US012593376B2

(12) United States Patent
Maehara et al.

(10) Patent No.: US 12,593,376 B2
(45) Date of Patent: Mar. 31, 2026

(54) HEATER AND APPARATUS AND METHOD FOR MANUFACTURING GLASS PRODUCT

(71) Applicant: AGC Inc., Tokyo (JP)

(72) Inventors: Terutaka Maehara, Tokyo (JP); Akifumi Niwa, Tokyo (JP); Shuntaro Hyodo, Tokyo (JP); Yukihito Akita, Tokyo (JP); Takashi Enomoto, Tokyo (JP); Yoji Doi, Tokyo (JP); Roger Pauli, Stourbridge (GB); Lawrence Keen, Stourbridge (GB)

(73) Assignee: AGC INC., Tokyo (JP)

( * ) Notice: Subject to any disclaimer, the term of this patent is extended or adjusted under 35 U.S.C. 154(b) by 961 days.

(21) Appl. No.: 17/840,254

(22) Filed: Jun. 14, 2022

(65) Prior Publication Data

US 2022/0312555 A1     Sep. 29, 2022

Related U.S. Application Data

(63) Continuation of application No. PCT/JP2020/046305, filed on Dec. 11, 2020.

(30) Foreign Application Priority Data

Dec. 20, 2019     (JP) .................................. 2019-230939

(51) Int. Cl.
*H05B 3/44* (2006.01)
*C03B 25/02* (2006.01)
*H05B 3/12* (2006.01)

(52) U.S. Cl.
CPC ............... *H05B 3/44* (2013.01); *C03B 25/02* (2013.01); *H05B 3/12* (2013.01);
(Continued)

(58) Field of Classification Search
CPC ...... H05B 3/44; H05B 3/12; H05B 2203/016; H05B 2203/025; H05B 2203/032;
(Continued)

(56) References Cited

U.S. PATENT DOCUMENTS 2,280,101 A     4/1942   Slayter et al.
3,912,477 A     10/1975  Brady et al.
(Continued)

FOREIGN PATENT DOCUMENTS

JP          S59-19893 B2     5/1984
JP          2001-124477 A    5/2001
(Continued)

OTHER PUBLICATIONS

International Searching Authority, "International Search Report," issued in connection with International Patent Application No. PCT/JP2020/046305, dated Jan. 19, 2021.
(Continued)

*Primary Examiner* — Phuong T Nguyen
(74) *Attorney, Agent, or Firm* — Foley & Lardner LLP

(57)          ABSTRACT

A heater includes a heat generating member being conductive and configured to radiate heat rays by being fed with electric power, and a tubular member constituting of a metal and accommodating the heat generating member, wherein the heat generating member is composed of a material containing carbon at 80% or more by mass, the tubular member is composed of a material including one or more selected from platinum, rhodium, tungsten, iridium, and molybdenum, and an insulating material is not provided between the heat generating member and the tubular member.

3 Claims, 8 Drawing Sheets

(52) U.S. Cl.
CPC .. *H05B 2203/016* (2013.01); *H05B 2203/025*
(2013.01); *H05B 2203/032* (2013.01)

(58) Field of Classification Search
CPC . H05B 3/64; H05B 3/009; H05B 3/04; H05B
3/145
USPC ....... 219/206, 426, 522, 523, 535, 540, 541,
219/552
See application file for complete search history.

(56) References Cited

U.S. PATENT DOCUMENTS

| | | | |
|---|---|---|---|
| 4,319,127 A | 3/1982 | Lindstrom et al. | |
| 4,862,137 A | 8/1989 | Jaume | |
| 6,122,308 A | 9/2000 | Katayama | |
| 2004/0119031 A1* | 6/2004 | Linow ..................... | H01K 1/06 |
| | | | 250/504 R |
| 2007/0235444 A1 | 10/2007 | Lewin | |
| 2021/0078892 A1 | 3/2021 | Maehara et al. | |

FOREIGN PATENT DOCUMENTS

| | | |
|---|---|---|
| JP | 2004-193130 A | 7/2004 |
| JP | 2007-529087 A | 10/2007 |
| JP | 2017-030987 A | 2/2017 |

OTHER PUBLICATIONS

International Searching Authority, "Written Opinion," issued in
connection with International Patent Application No. PCT/JP2020/
046305, dated Jan. 19, 2021.

* cited by examiner

HEATER AND APPARATUS AND METHOD FOR MANUFACTURING GLASS PRODUCT

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2020/046305 filed on Dec. 11, 2020 and designating the U.S., which claims priority to Japanese Patent Application No. 2019-230939 filed on Dec. 20, 2019. The entire contents of the foregoing applications are incorporated herein by reference.

BACKGROUND OF THE INVENTION

1. Field of the Invention

The present invention relates to a heater, a manufacturing apparatus for manufacturing a glass product, and a manufacturing method for manufacturing a glass product.

2. Description of the Related Art

Conventionally, a heater has been used as a heat source in a melting furnace for melting a metal such as aluminum.

For example, PTL 1 describes a heater constructed by introducing a coiled heating body and an insulating powder material into a ceramic protection tube. PTL 2 describes a heater constructed by introducing a coiled resistor and a heat-resistant material into a metal sheath. PTL 3 describes an electric device that supplies heat to molten glass by energizing a platinum annular tube.

CITATION LIST

Patent Literature

[PTL 1] Japanese Unexamined Patent Publication No. 2001-124477
[PTL 2] U.S. Pat. No. 4,319,127
[PTL 3] Japanese Examined Patent Publication No. S59-19893
[PTL 4] Japanese Translation of PCT Publication No. 2007-529087

SUMMARY OF THE INVENTION

Technical Problem

However, conventional heaters described in PTLs 1 and 2 are designed to be used mainly by being immersed in molten metal such as aluminum, and it is difficult to use such heaters upon heating the heaters to a high temperature of 1200 degrees Celsius or more. PTL 4 discloses a heater in which a rod-shaped heating element supported by a supporting ceramic disk is contained within a ceramic pipe. However, this heater is also difficult to be heated to a high temperature of 1200 degrees Celsius or more. PTL 3 describes a heater expected to be used by being immersed in molten glass. However, it is necessary to apply a large current to the heater, and as a result, there arises a problem in that a large-scale power supply device is required. It is stated that a typical voltage and a typical current are 5 V to 6 V and 5000 A, respectively. Therefore, there still is a need for a heater capable of heating to a higher temperature without the need for a large power supply device such as a power supply device that passes a large current of 1000 A or more.

The present invention has been made in view of such circumstances, and it is an object of the present invention to provide a heater capable of heating to 1200 degrees Celsius or more without the need for a large power supply device. In addition, it is an object of the present invention to provide a manufacturing apparatus having such a heater for manufacturing a glass product and a manufacturing method using such a heater for manufacturing a glass product.

Solution to Problem

According to the present invention, provided is a heater including:
  a heat generating member being conductive and configured to radiate heat rays by being fed with electric power; and
  a tubular member constituting of a metal and accommodating the heat generating member,
  wherein the heat generating member is composed of a material containing carbon at 80% or more by mass,
  the tubular member is composed of a material including one or more selected from platinum, rhodium, tungsten, iridium, and molybdenum, and
  an insulating material is not provided between the heat generating member and the tubular member.

Also, according to the present invention, provided is a manufacturing apparatus for manufacturing a glass product, the manufacturing apparatus including:
  a melting unit configured to melt a glass material to form molten glass; and
  a foaming unit configured to make formed glass from the molten glass,
  the manufacturing apparatus further optionally comprising a conveying unit configured to connect the melting unit and the forming unit,
  wherein a heater is provided in any given unit disposed between the melting unit and the forming unit, the any given unit not including the forming unit,
  wherein the heater includes:
    a heat generating member being conductive and configured to radiate heat rays by being fed with electric power; and
    a tubular member constituting of a metal and accommodating the heat generating member,
  wherein the heat generating member is composed of a material containing carbon at 80% or more by mass,
  the tubular member is composed of a material including one or more selected from platinum, rhodium, tungsten, iridium, and molybdenum, and
  an insulating material is not provided between the heat generating member and the tubular member.

Further, according to the present invention, provided is a manufacturing method for manufacturing a glass product, including:
  a melting step of melting a glass material to form molten glass; and
  a forming step of making formed glass from the molten glass,
  wherein the molten glass comes into contact with a heater in any given step between the melting step and the foaming step, the any given step not including the forming step, wherein the heater includes:

a heat generating member being conductive and configured to radiate heat rays by being fed with electric power; and a tubular member constituting of a metal and accommodating the heat generating member, wherein the heat generating member is composed of a material containing carbon at 80% or more by mass, the tubular member is composed of a material including one or more selected from platinum, rhodium, tungsten, iridium, and molybdenum, and an insulating material is not provided between the heat generating member and the tubular member.

Advantageous Effects of Invention

According to the present invention, a heater capable of heating to 1200 degrees Celsius or more without the need for a large power supply device can be provided. In addition, according to the present invention, a manufacturing apparatus having such a heater for manufacturing a glass product and a manufacturing method using such a heater for manufacturing a glass product can be provided.

BRIEF DESCRIPTION OF THE DRAWINGS

FIG. 5 is a drawing schematically illustrating an example of a cross section taken along a central axis of still another heater according to the embodiment of the present invention.

DETAILED DESCRIPTION OF THE PREFERRED EMBODIMENTS

Figure 1:
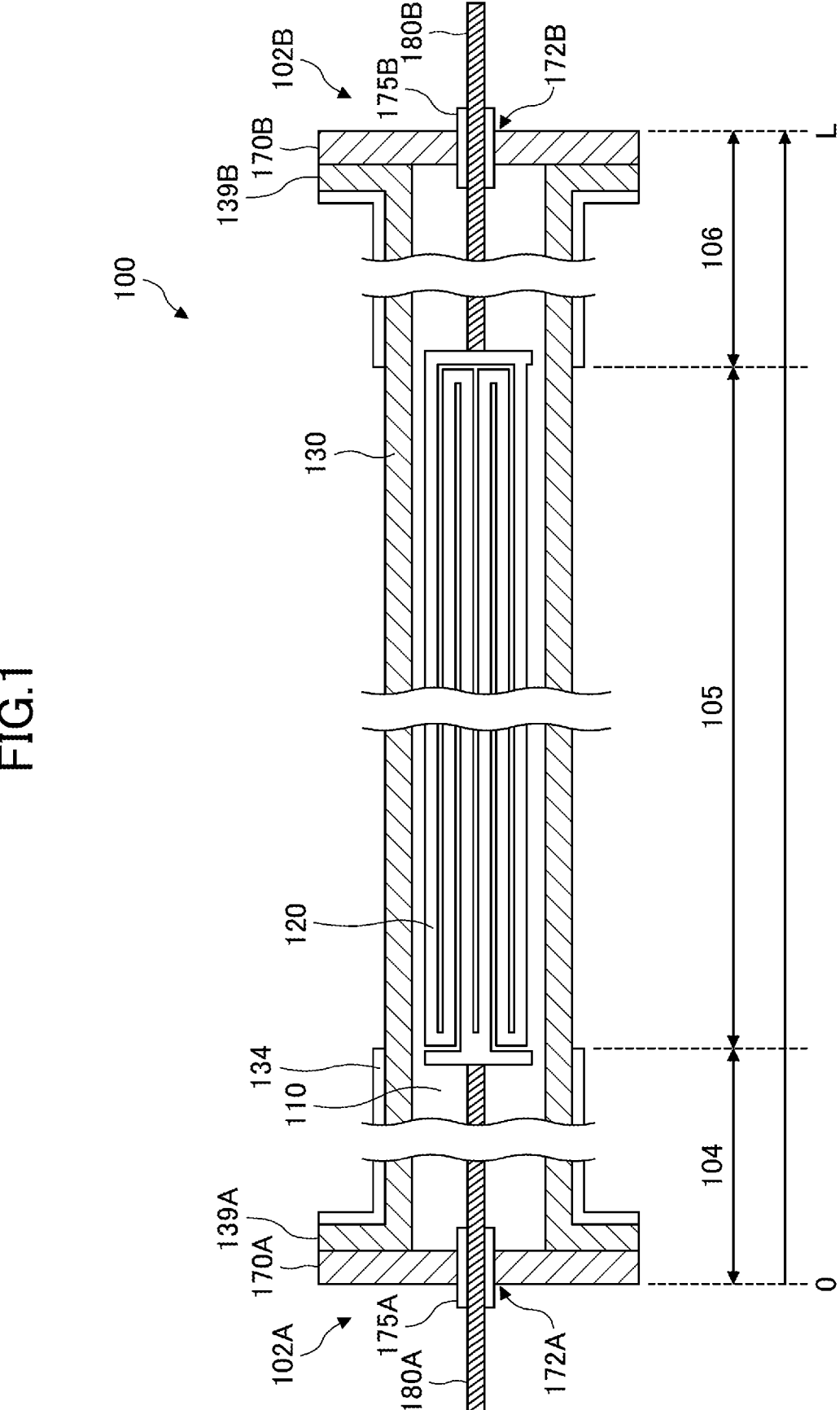
FIG. 1 is a drawing schematically illustrating an example of a cross section taken along a central axis of a heater according to an embodiment of the present invention.

Hereinafter, an embodiment of the present invention is explained.

According to an embodiment of the present invention, provided is a heater including:

a heat generating member being conductive and configured to radiate heat rays by being fed with electric power; and a tubular member constituting of a metal and accommodating the heat generating member, wherein the heat generating member is composed of a material containing carbon at 80% or more by mass, the tubular member is composed of a material including one or more selected from platinum, rhodium, tungsten, iridium, and molybdenum, and an insulating material is not provided between the heat generating member and the tubular member.

As explained above, there is a problem in conventional heaters when the conventional heaters are used at a high temperature of 1200 degrees Celsius or more.

The inventors of the present application have earnestly conducted research of heaters in order to address such problems. As a result, the inventors of the present application have discovered that a tubular member (outer tube), which is in contact with the outside (heating target), can be heated to a higher temperature by a radiation heat transfer from the heat generating member than by a conventional method for conducting heat from the heat generating member.

In a case where a tubular member is heated by a radiation method, it is considered effective not to allow any substance other than gas to exist between the heat generating member and the tubular member. However, in that case, there may be a problem in that the heat generating member is deformed when the heater is used at a high temperature (i.e., when the temperature of the constituent members increases to a high temperature), and the heat generating member and the tubular member come into contact with each other. When such contact occurs in a case where the tubular member is composed of metal, the supplied current flows toward the tubular member having a lower resistance, and the temperature of the heat generating member does not rise.

In order to deal with this problem, it may be considered to provide an insulating material between the heat generating member and the tubular member. However, when an insulating material is provided between the heat generating member and the tubular member, the heat rays from the heat generating member are blocked by the insulating material, which makes it difficult to heat the tubular member by the radiation method.

In contrast, in the heater according to the embodiment of the present invention, the heat generating member is composed of a material containing carbon (C) at 80% or more (hereinafter such a material may be referred to as "a material mainly made of carbon (C)").

Such a heat generating member exhibits a high rigidity under a high-temperature use environment. Therefore, in the heater according to the embodiment of the present invention, the amount of deformation can be significantly reduced even under the high-temperature use environment. Furthermore, as a result, even if an insulating material is not provided between the heat generating member and the tubular member, the problem that the heat generating member and the tubular member come into contact with each other can be significantly alleviated.

The heat generating member may be constituting of, for example, graphite or carbon fiber reinforced carbon composite (CC composite).

With the above-described feature, in the heater according to the embodiment of the present invention, the heat rays radiated from the heat generating member can be effectively emitted to the tubular member. Further, even when the heater is heated to a high temperature, a contact between the heat generating member and the tubular member can be significantly prevented.

Therefore, with the heater according to the embodiment of the present invention, the tubular member can be heated to a high temperature of 1200° C. or more relatively easily.

Furthermore, in the heater according to the embodiment of the present invention, the resistance value of the heat generating member can be increased to a desired value by configuring the heat generating member in various shapes. Therefore, the heater according to the embodiment of the present invention can use a high-voltage and low-current power supply device instead of a conventional low-voltage and high-current large-scale power supply device, and the size of the entire heating system that heats the heating target can be reduced.

(Heater According to the Embodiment of the Present Invention)

An example of configuration of a heater according to an embodiment of the present invention is explained with reference to drawings.

FIG. 1 schematically illustrates an example of structure of a heater according to the embodiment of the present invention. FIG. 1 illustrates a cross section taken along a central axis of a heater 100 according to the embodiment of the present invention. However, with respect to the heat generating member 120, which is explained later, a schematic unfolded view is shown, instead of a cross-sectional view, for the sake of facilitating understanding of the flow of currents.

As illustrated in FIG. 1, the heater 100 according to the embodiment of the present invention (hereinafter referred to as a "first heater") has an approximate rod shape extending in a linear manner from a first heater end portion 102A to a second heater end portion 102B.

The first heater end portion 102A is closed by a first lid member 170A. The second heater end portion 102B is closed by a second lid member 170B. Therefore, in the first heater 100, an internal space 110 isolated from the outside is formed.

The internal space 110 is made into a non-oxidizing gas atmosphere in order to prevent the members contained in the internal space 110 from oxidizing. For example, the internal space 110 may be filled with an inert gas such as argon.

The first heater 100 includes a heat generating member 120 and a tubular member 130.

The heat generating member 120 is accommodated in the internal space 110. The tubular member 130, as well as the first lid member 170A and the second lid member 170B explained above, are members for dividing the internal space 110 of the first heater 100. The tubular member 130 protects the members accommodated in the internal space 110. Specifically, the tubular member 130 may be constituting of a material including one or more selected from platinum, rhodium, tungsten, iridium, molybdenum.

The heat generating member 120 functions as a heating body that generates heat when it is energized. The heat generating member 120 is composed of a material mainly made of carbon (C). One of the end portions of the heat generating member 120 is electrically connected to a first lead wire 180A. The other of the end portions of the heat generating member 120 is electrically connected to a second lead wire 180B.

The heat generating member 120 is held by the first lead wire 180A and the second lead wire 180B so as not to come into contact with the tubular member 130.

The first lead wire 180A extends to the outside of the internal space 110 through a first opening 172A provided in the first lid member 170A. Likewise, the second lead wire 180B extends to the outside of the internal space 110 through a second opening 172B provided in the second lid member 170B. In order to prevent the first lead wire 180A from coming into contact with the first lid member 170A, a first insulating member 175A is attached to the first opening

172A of the first lid member 170A. Likewise, in order to prevent the second lead wire 180B from coming into contact with the second lid member 170B, a second insulating member 175B is attached to the second opening 172B of the second lid member 170B.

The material mainly made of carbon has a relatively high electrical conductivity. Therefore, the heat generating member 120 does not have to be in a simple rod shape in order to increase the electric resistance of the heat generating member 120, and may be, for example, in a tubular shape with periodic or aperiodic slits as illustrated in FIG. 1. The periodic slits may be arranged in the longitudinal direction of the heat generating member 120, or may be arranged in the circumferential direction. Alternatively, the heat generating member 120 may have a helix shape.

Hereinafter, an operation of the first heater 100 having such a configuration is explained.

When the first heater 100 is used, the first heater 100 is installed in or in proximity to the heating target. Also, a power supply device (not illustrated) is used to supply a current to the first lead wire 180A and the second lead wire 180B.

With the supplied electric current, the heat generating member 120 connected to the first lead wire 180A and the second lead wire 180B is resistance-heated. Also, this causes heat rays to be radiated from the heat generating member 120.

First, the heat rays radiated from the heat generating member 120 are emitted to the tubular member 130. Accordingly, the temperature of the tubular member 130 rises. Also, due to this rise in the temperature, the heating target in contact with the outer surface of the tubular member 130 is heated.

In this manner, the heating target can be heated by using the first heater 100.

In the first heater 100, the heat generating member 120 may be constituting of a material mainly made of carbon (C). Therefore, even when the temperature of the heat generating member 120 rises, the heat generating member 120 is unlikely to deform, and thus can significantly prevent electrical contact between the heat generating member 120 and the tubular member 130.

In addition, with the first heater 100, the tubular member 130 can be effectively irradiated with the heat rays generated from the heat generating member 120 by the radiation method. As a result, the heat collection efficiency of the tubular member 130 is increased, and the heating target can be heated to a relatively higher temperature. For example, in the first heater 100, the tubular member 130 can be stably heated to 1200 degrees Celsius or more, for example, to 1400 degrees Celsius or more or to 1500 degrees Celsius or more.

In addition, with the first heater 100, it is not necessary to use a large-scale device to energize the heat generating member 120, and the size of a system for heating the heating target can be reduced.

(Components of First Heater 100)

Hereinafter, the components included in the heater according to the embodiment of the present invention is explained in more details. In this case, for the sake of clarity, the components are explained with reference to the first heater 100, for example. Therefore, when the members are referred to, reference signs illustrated in FIG. 1 are used.

(First Heater 100)

The shape of the first heater 100 is not particularly limited. The first heater 100 may have, for example, a substantially cylindrical or substantially prismatic form. The cross section of the first heater 100 perpendicular to the longitudinal direction (i.e., the direction of the central axis) may be a substantially circular shape, a substantially elliptical shape, a substantially triangular shape, a substantially quadrangular shape (including trapezoids), or any other polygonal shape.

In the following description, for example, it is assumed that the cross section of the first heater 100 is a substantially circular shape.

Also, for the sake of clarifying the explanation, as illustrated in FIG. 1, the first heater 100 is divided into three parts along the longitudinal direction, i.e., a first part 104, a second part 105, and a third part 106, for the sake of convenience.

Among them, where the end of the first heater end portion 102A of the first heater 100 is defined as a position at a distance 0 (zero), the first part 104 represents a zone between the position at the distance 0 and a position at a predetermined distance ($X_1$) away from the position at the distance 0 toward the second heater end portion 102B.

Also, the second part 105 represents a zone between the position at the distance $X_1$ and a position at a predetermined distance ($X_2$) away from the position at the distance 0 toward the second heater end portion 102B. Therefore, the length of the second part 105 is $X_2-X_1$.

The third part 106 represents a zone between the position at the distance $X_2$ and the second heater end portion 102B. Therefore, the length of the third part 106 is $L-X_2$. In this case, L denotes the entire length of the first heater 100 (specifically, the outer surface of the first lid member 170A to the outer surface of the second lid member 170B; see FIG. 1).

In this case, the second part 105 includes the part where the temperature rises most greatly while the first heater 100 is used. Normally, the first heater 100 reaches the highest temperature at an approximate center of the second part 105, i.e., a position at $L/2(=X_1+(X_2-X_1)/2=X_1/2+X_2/2)$ with respect to the position at the distance 0.

In contrast, the first part 104 and the third part 106 include parts where the temperatures do not rise greatly while the first heater 100 is used. In other words, normally, while the first heater 100 is used, the temperature of the first part 104 becomes the highest at the position of $X_1$, and tends to gradually decrease toward the position at the distance 0. In the third part 106, the temperature tends to change in a similar manner.

In the first heater 100, the length ($X_1$) of the first part 104, the length ($X_2-X_1$) of the second part 105, and the length ($L-X_2$) of the third part 106 change according to the entire length L, the specification, and the like of the first heater 100.

In the present application, for the sake of convenience, a portion around the connection portion between the heat generating member 120 and the first lead wire 180A is defined as a boundary between the first part 104 and the second part 105, and a portion around the connection portion between the heat generating member 120 and the second lead wire 180B is defined as a boundary between the second part 105 and the third part 106. However, such definitions are merely examples, and it should be noted that a boundary between parts may be defined on the basis of other criteria.

(Components of First Heater 100)

Hereinafter, each member constituting the first heater 100 is explained in details.

(Internal Space 110, First Lid Member 170A, and Second Lid Member 170B)

The internal space 110 where various members are accommodated preferably has a low oxygen partial pressure. For this reason, the internal space 110 may be filled with a non-oxidizing gas such as a reducing gas and/or an inert gas. Hydrogen can be used as the reducing gas. As the inert gas, one or more selected from argon, helium, neon, krypton, xenon, radon, and nitrogen can be used.

In addition to this, or separately from this, the internal space 110 may be adjusted to be substantially at the atmospheric pressure while the first heater 100 is used.

In order to achieve such a non-oxidizing environment and/or an atmospheric pressure environment during use, one or two ports in communication with the internal space 110 may be provided in at least one of the first lid member 170A and the second lid member 170B. Through these ports, the internal space 110 can be filled with gas and the gas can be exhausted from the internal space 110.

The configurations of the first lid member 170A and the second lid member 170B are not particularly limited as long as the environment of the internal space 110 can be properly maintained. Therefore, the description about the first lid member 170A and the second lid member 170B is omitted here.

(Heat Generating Member 120, First Lead Wire 180A, and Second Lead Wire 180B)

The heat generating member 120 is composed of a material mainly made of carbon (C).

The heat generating member 120 may be constituting of, for example, graphite or carbon fiber reinforced carbon composite (CC composite).

In this case, it should be noted that the heat generating member 120 does not necessarily have to be constituting of the same material and/or made to have the same shape over the entire length, so long as it is composed of a material mainly made of carbon (C).

In other words, the heat generating member 120 may have multiple materials and/or multiple shapes over the entire length. For example, the heat generating member 120 may be configured to have a first material in a first segment, a second material in a second segment, . . . and an n-th material in an n-th segment. In this case, n denotes an integer of 2 or more.

Also, the heat generating member 120 may be configured to have a first form in a first segment, a second form in a second segment, . . . and an n-th form in an n-th segment. In this case, n denotes an integer of 2 or more. When the heat generating member 120 has multiple segments in this manner, temperature changes can be intentionally made over the entire length. For example, in a case where the first segment is made of a material of which resistance is higher than a second segment, the temperature of the first segment can be set to a higher temperature than the second segment, even in a case where the heat generating member 120 is energized with the same current value. Likewise, in a case where the first segment is made into a form having a resistance value per unit length higher than the second segment, the temperature of the first segment can be set to a higher temperature than the second segment. When the first heater 100 is used, the heat generating member 120 can attain a temperature of 1500 degrees Celsius or more or 1600 degrees Celsius or more.

The form of the heat generating member 120 is not particularly limited. As described above, the heat generating member 120 may be in, for example, a tubular shape with periodic or aperiodic slits, or a helix shape. Alternatively, the heat generating member 120 may have a shape of a combination of these.

In a case where the heat generating member 120 has slits, the slits may be arranged in the longitudinal direction or the circumferential direction of the heat generating member 120

Figure 2:
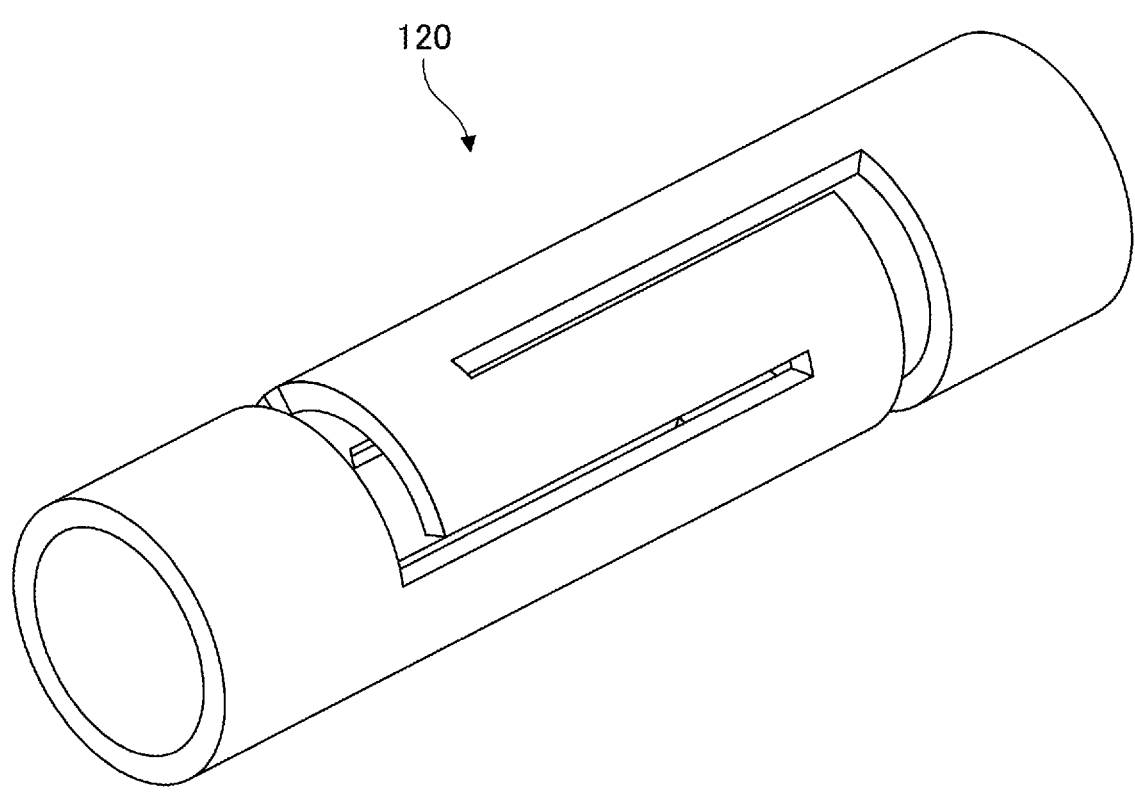
FIG. 2 is a perspective view schematically illustrating an example of a heat generating member that is applied to the heater as illustrated in FIG. 1.

FIG. 2 schematically illustrates an example of a form of the heat generating member 120.

As illustrated in FIG. 2, the heat generating member 120 has a tubular shape with multiple slits. Some slits are arranged along the axial direction, and other slits are famed along the circumferential direction.

When the heat generating member 120 as illustrated in FIG. 2 is unfolded, the heat generating member 120 is in the foam as schematically illustrated in FIG. 1 explained above.

In the heat generating member 120, the electric resistance between the first lead wire 180A and the second lead wire 180B at the room temperature is preferably 0.01Ω or more, and more preferably 0.1Ω or more. The electric resistance between the first lead wire 180A and the second lead wire 180B in a temperature range of 1000 degrees Celsius or more is preferably 0.01Ω or more, more preferably 0.1Ω or more, still more preferably 0.5Ω or more, and yet still more preferably 1.0Ω or more.

In the example as illustrated in FIG. 1, both ends of the heat generating member 120 are bonded to the first lead wire 180A and the second lead wire 180B. However, this bonding is not always necessary, and the first lead wire 180A and the second lead wire 180B may be omitted. Both ends of the heat generating member 120 may extend directly to the outside of the first heater 100.

Conversely, the first lead wire 180A and the second lead wire 180B themselves are preferably members (for example, copper) having lower resistivities than the heat generating member 120. In this case, a rise in the temperatures of the first heater end portion 102A and the second heater end portion 102B can be alleviated.

The respective dimensions with respect to the heat generating member 120 change according to the specifications of the first heater 100. As merely an example, if the heat generating member 120 is in a tube shape, the outer diameter of the tube may be in a range of 10 mm to 200 mm.

(Tubular Member 130)

Specifically, the tubular member 130 may be constituting of a material including one or more selected from platinum, rhodium, tungsten, iridium, molybdenum.

In this case, the tubular member 130 does not have to be constituting of a single material, and the tubular member 130 may be constituting of a combination of two or more materials.

It should be noted that an oxidation resistant coating layer 134 may be provided on all or a part of the first part 104 and/or the third part 106 of the tubular member 130 Such a configuration is particularly preferred when the tubular member 130 is composed of a metal such as molybdenum or iridium.

Generally, molybdenum exhibits a significant decrease in the oxidation resistance in a temperature range of about 500 degrees Celsius or more, and iridium also exhibits a significant decrease in the oxidation resistance in a temperature range of about 900 degrees Celsius or more. Therefore, depending on the environment in which the first heater 100 is used, atmospheric oxidation may occur in portions of the first part 104 and/or the third part 106 of the tubular member 130 exposed to the atmosphere.

However, when the coating layer 134 is provided, such atmospheric oxidation can be reduced.

It should be noted that a portion corresponding to the tubular member 130 corresponding to the second part 105 is in contact with the heating target, which is not the atmospheric air, while the first heater 100 is used. Therefore, in such a portion, the risk of atmospheric oxidation is low. For this reason, it is not necessary to provide the coating layer 134 in such a portion.

The coating layer 134 may be; for example, a heat-resistant alloy such as MCrAlY (M is at least one metal selected from Ni, Co, and Fe); a silicide such as $MoSi_2$; platinum; glass; ceramics; or the like.

The two tips of the tubular member 130 preferably have respective flange portions 139A and 139B as illustrated in FIG. 1, such as shapes for making flange connections with the first lid member 170A and the second lid member 170B. The flange connections of the flange portions 139A and 139B to the first lid member 170A and the second lid member 170B, respectively, allow the internal space 110 to be properly sealed.

An O-ring such as a heat-resistant rubber and a metallic gasket may be provided between the flange portion 139A (and 139B) and the lid member 170A (and 170B).

A thickness of the tubular member 130 may be, for example, in a range of 0.3 mm to 10 mm.

For example, a maximum value (maximum distance) of a gap between the tubular member 130 and the heat generating member is in a range of 0.5 mm to 15 mm, preferably in a range of 1 mm to 10 mm, and still more preferably in a range of 1 mm to 5 mm.

(First Insulating Member 175A and Second Insulating Member 175B)

The first insulating member 175A is composed of an insulating material. In addition, the first insulating member 175A is required to have a seal function for appropriately sealing the gap between the first opening 172A of the first lid member 170A and the first lead wire 180A.

The insulating member having such as seal function is well known to a person skilled in the art.

The same can be said with respect to the second insulating member 175B.

It should be noted that the configuration of the first insulating member 175A and the second insulating member 175B as illustrated in FIG. 1 is merely an example. It is clear to a person skilled in the art that these configurations are not particularly limited as long as the first lead wire 180A and the second lead wire 180B can be properly routed to the outside.

(Another Heater According to the Embodiment of the Present Invention)

An example of configuration of another heater according to an embodiment of the present invention is explained with reference to FIG. 3.

Figure 3:
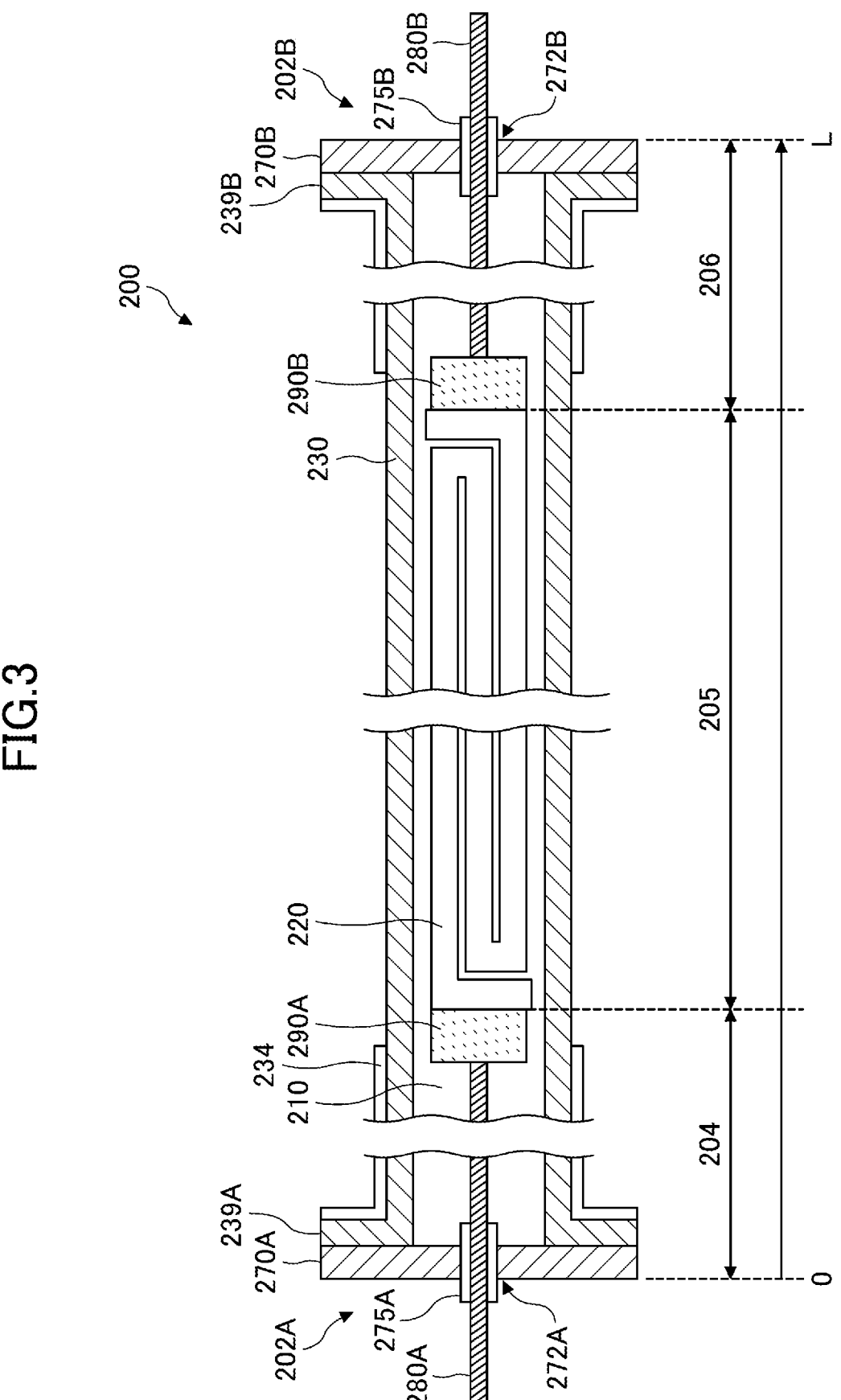
FIG. 3 is a drawing schematically illustrating an example of a cross section taken along a central axis of another heater according to an embodiment of the present invention.

FIG. 3 schematically illustrates an example of a structure of another heater (hereinafter referred to as a "second heater") according to the embodiment of the present invention.

As illustrated in FIG. 3, the second heater 200 has a configuration similar to the first heater 100 explained above. Therefore, in FIG. 3, reference signs obtained by adding 100 to the reference signs used in FIG. 1 are given to the members similar to those of the first heater 100.

However, in the second heater 200, instead of directly joining the first lead wire 280A to a heat generating member 220, a conductive heat-resistant material 290A is interposed between the first lead wire 280A and the heat generating member 220. Likewise, instead of directly joining the second lead wire 280B to the heat generating member 220, a conductive heat-resistant material 290B is interposed between the second lead wire 280B and the heat generating member 220.

In the first lead wire 280A and the second lead wire 280B, the temperature tends to be high at the joint with the heat generating member 220 and in the vicinity thereof. However, the conductive heat-resistant material 290A is interposed between the heat generating member 220 and the first lead wire 280A, so that a rise in the temperature of the first lead wire 280A can be significantly alleviated. Furthermore, the conductive heat-resistant material 290B is interposed between the heat generating member 220 and the second lead wire 280B, so that a rise in the temperature of the second lead wire 280B can be significantly alleviated.

The heat generating member 220 is held by the conductive heat-resistant material 290A connected to the first lead wire 280A and the conductive heat-resistant material 290B connected to the second lead wire 280B, so as not to come into contact with the tubular member 230.

As described above, the heat generating member 220 is composed of a material mainly made of carbon (C). Therefore, even when the temperature of the heat generating member 220 rises while the second heater 200 is used, the heat generating member 220 is less likely to deform and can significantly prevent electrical contact between the heat generating member 220 and the tubular member 230.

However, the conductive heat-resistant materials 290A and 290B are not necessarily constituting of a material mainly made of carbon (C).

Therefore, when the temperatures of the conductive heat-resistant materials 290A and 290B rise while the second heater 200 is used, the conductive heat-resistant materials 290A and 290B may deform.

In order to avoid this problem, in the second heater 200, an electrically insulating member may be interposed between the conductive heat-resistant material 290A and the tubular member 230. Therefore, an electrical contact between the conductive heat-resistant material 290A and the tubular member 230 can be reliably reduced. Likewise, an electrically insulating member may be interposed between the conductive heat-resistant material 290B and the tubular member 230.

For example, the electrically insulating member may be constituting of aluminum oxides, magnesium oxides, zirconium oxides, yttrium oxides, cerium oxides, beryllium oxides, zirconium silicates (zircons), silicon dioxides, mullites, boron nitrides, aluminum nitrides, and the like. Also, for example, the electrically insulating member may be constituting of sapphire (monocrystalline aluminum oxide), transparent polycrystalline aluminum oxides, aluminum oxynitrides, yttrium oxides, spinel, zirconium oxides, yttrium aluminum garnet, magnesium oxides, and the like. Alternatively, the electrically insulating member may be constituting of quartz glass or borosilicate glass.

In the second heater 200, the form of the heat generating member 220 is different from the heat generating member 120 of the first heater 100 as illustrated in FIG. 1. However, this is not always required. For example, the heat generating member 120 as illustrated in FIG. 2 may be used as the heat generating member 220 of the second heater 200.

Figure 4:
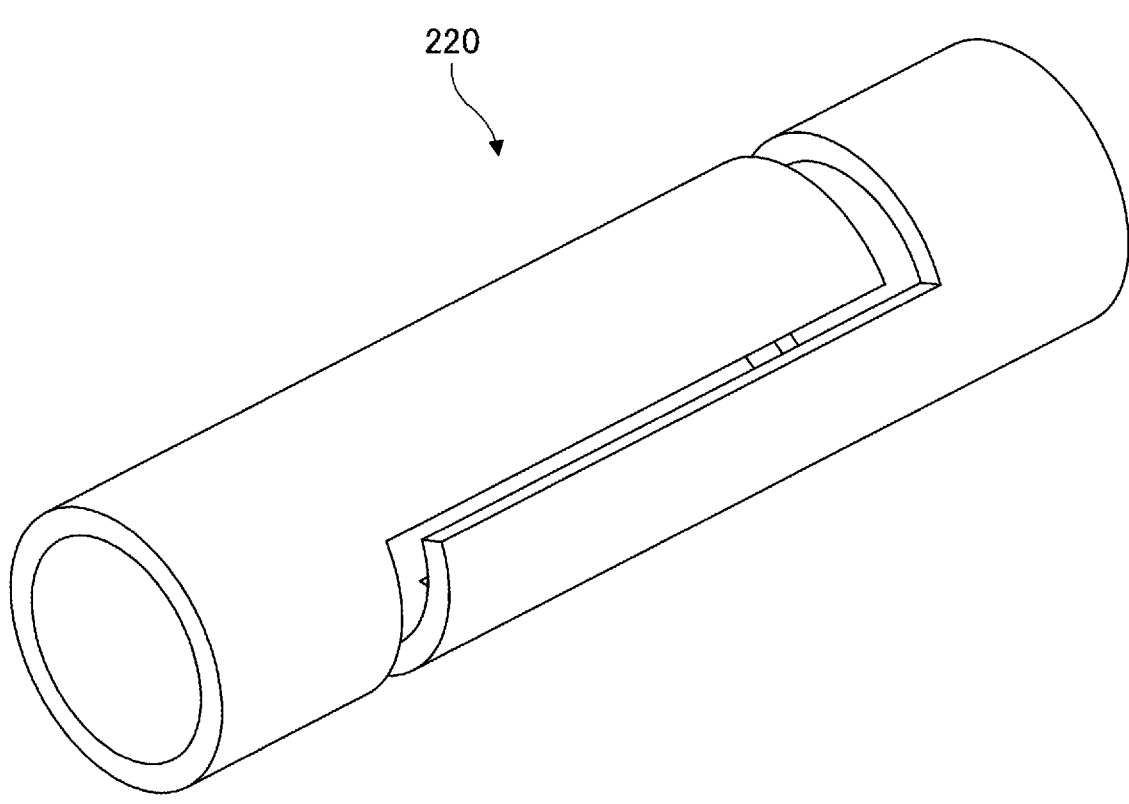
FIG. 4 is a perspective view schematically illustrating an example of a heat generating member that is applied to the heater as illustrated in FIG. 3.

FIG. 4 schematically illustrates an example of a form of the heat generating member 220.

As illustrated in FIG. 4, the heat generating member 220 has a tubular shape with multiple slits. Some slits are arranged along the axial direction, and other slits are famed along the circumferential direction.

When the heat generating member 220 as illustrated in FIG. 4 is unfolded, the heat generating member 220 is in the form as schematically illustrated in FIG. 3 explained above.
(Components of Second Heater 200)

The above description can be referred to for description of most of the components included in the second heater 200. Accordingly, hereinafter, the features of the conductive heat-resistant materials 290A and 290B included in the second heater 200 are explained in detail.
(Conductive Heat-Resistant Materials 290A and 290B)

The conductive heat-resistant materials 290A and 290B may be constituting of, for example, a material mainly made of carbon (C) such as graphite or carbon fiber reinforced carbon composite of which the resistance is lower than the heat generating member 220.

Alternatively, the conductive heat-resistant materials 290A and 290B may be constituting of, for example, platinum, rhodium, tungsten, iridium, molybdenum, and an alloy thereof. Still alternatively, the conductive heat-resistant materials 290A and 290B may be constituting of stainless steel, a nickel-based alloy, or the like.

The conductive heat-resistant materials 290A and 290B may be in a rod shape, a pipe shape, or a plate shape, or may have a fin shape in order to enhance the heat radiation property.

In this case, it should be noted that the conductive heat-resistant materials 290A and 290B do not necessarily have to be constituting of the same material and/or made to have the same shape over the entire length.

In other words, the conductive heat-resistant materials 290A and 290B may have multiple materials and/or multiple shapes over the entire length.
(Another Heater According to the Embodiment of the Present Invention)

An example of configuration of another heater according to an embodiment of the present invention is explained with reference to FIG. 5.

Figure 5:
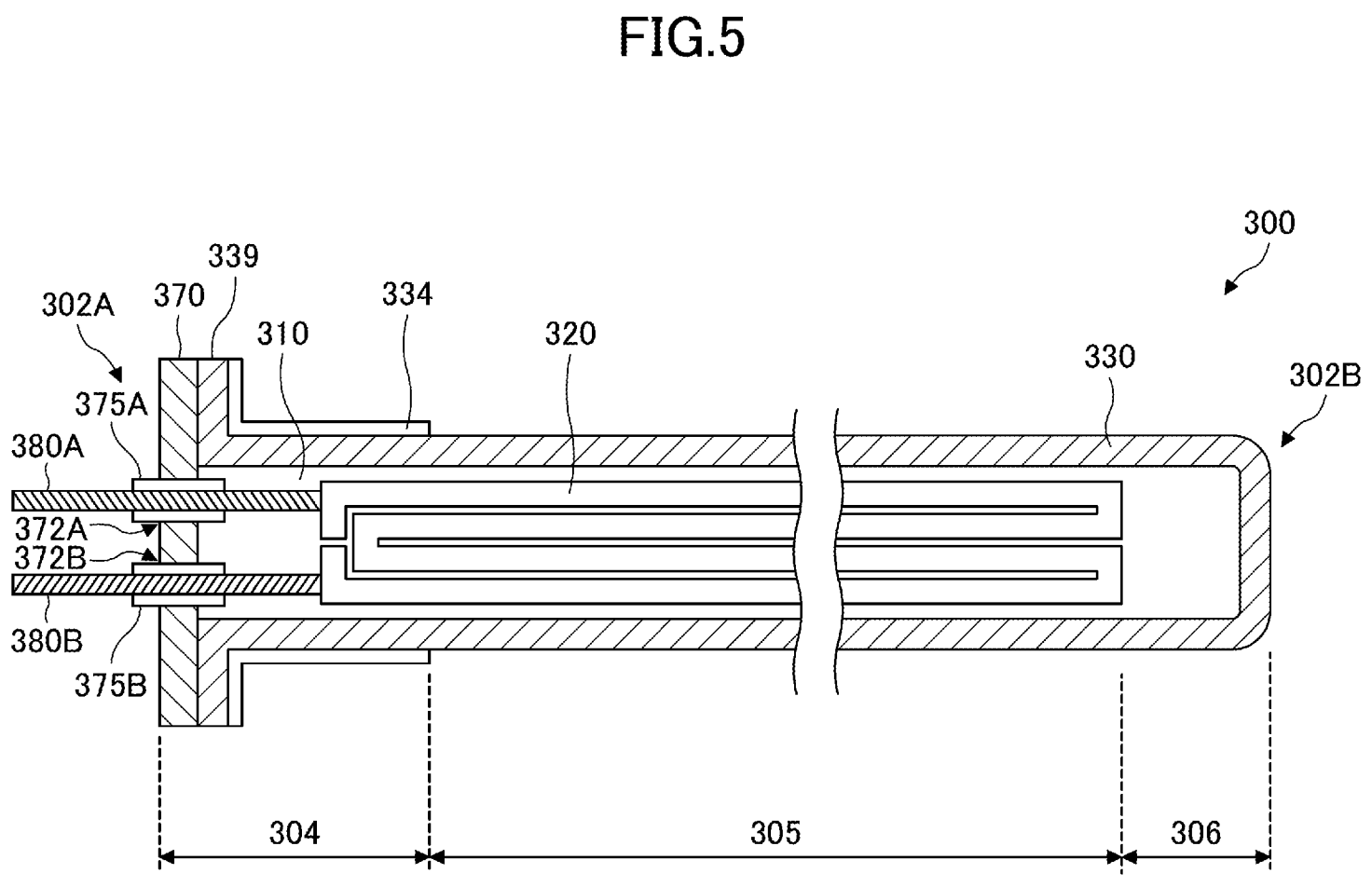

FIG. 5 schematically illustrates an example of a structure of still another heater (hereinafter referred to as a "third heater") according to the embodiment of the present invention.

As illustrated in FIG. 5, a third heater 300 has a configuration similar to the first heater 100 explained above. Therefore, in FIG. 5, reference signs obtained by adding 200 to the reference signs used in FIG. 1 are given to the members similar to those of the first heater 100.

However, the third heater 300 mainly has a difference in that the structure of a second heater end portion 302B is different from the structure of the second heater end portion 102B of the first heater 100.

That is, in the third heater 300, a metal tube of which one end is closed is used as the tubular member 330. As a result, in the third heater 300, the members provided in the second heater end portion 102B of the first heater 100 (i.e., the second lid member 170B, the second insulating member 175B, and the like) are omitted.

However, in the third heater 300, the second lead wire 380B needs to be routed to the outside through the side of the first heater end portion 302A.

Therefore, a heat generating member 320 is configured so that both end portions are guided to the same side.

For example, in a case where the heat generating member 320 is in a helix shape, one end may be passed through the inside of the helix to extend to the same side as the other end. Alternatively, the heat generating member 320 may be formed in a double helix shape so that both ends are provided on the same side.

Figure 6:
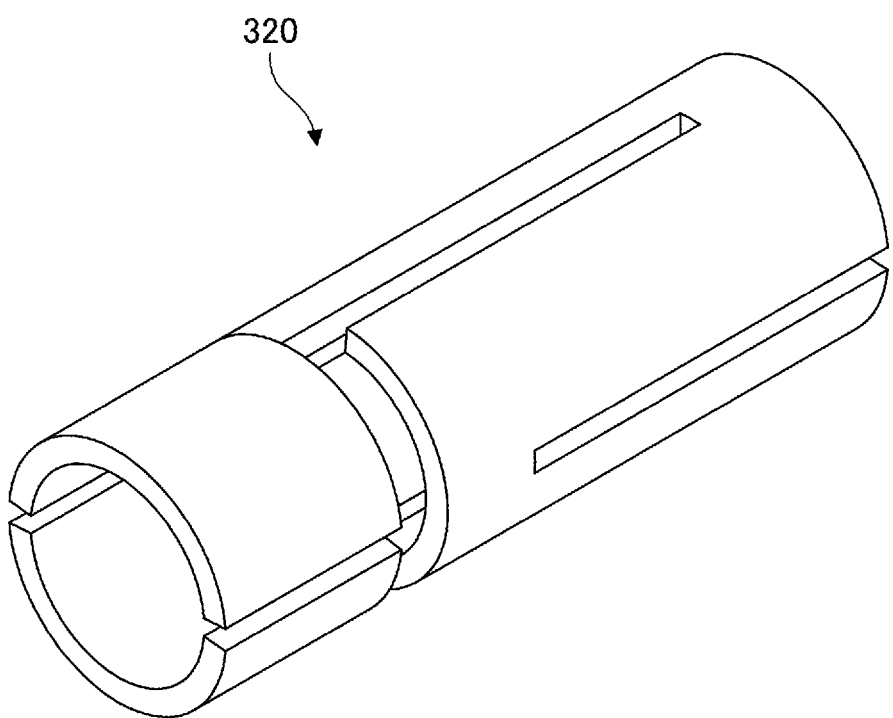
FIG. 6 is a perspective view schematically illustrating an example of a heat generating member that is applied to the heater as illustrated in FIG. 5.

FIG. 6 schematically illustrates an example of a form of the heat generating member 320.

As illustrated in FIG. 6, the heat generating member 320 has a tubular shape with multiple slits. Some slits are arranged along the axial direction, and other slits are famed along the circumferential direction.

When the heat generating member 320 as illustrated in FIG. 6 is unfolded, the heat generating member 320 is in the foam as schematically illustrated in FIG. 5 explained above.

Furthermore, a lid member 370 is used as the first heater end portion 302A of the third heater 300.

This lid member 370 is provided with a first opening 372A through which the first lead wire 380A is routed to the outside and a second opening 372B through which the second lead wire 380B is routed to the outside. The first insulating member 375A is inserted into the first opening 372A of the lid member 370, and the first lead wire 380A penetrates through the first insulating member 375A to be routed to the outside. The second insulating member 375B is inserted into the second opening 372B, and the second lead wire 380B penetrates through the second insulating member 375B to be routed to the outside.

It is clear that the above-mentioned effects can also be obtained with the third heater 300. The third heater 300 can also effectively irradiate the tubular member 330 with the heat rays generated from the heat generating member 320 by the radiation method. As a result, the heat collection efficiency of the tubular member 330 is increased, and the tubular member 330 can be heated to a relatively higher temperature.

In addition, it is not necessary to use a large-scale device to energize the heat generating member 320, and the size of a system for heating the heating target can be reduced.

In such a heater as illustrated in FIG. 5 in which the lead wires are gathered at one end, the second heater end portion can be brought into contact with the heating target. Therefore, such a heater can also be used as, for example, a type of heat source that is simply immersed in a melting furnace that melts materials. Such a heater can also be used as a type of heat source that is inserted, in a penetrating manner, from one furnace wall of the melting furnace to the other furnace wall opposite the one wall.

Heaters such as the first heater 100 and the second heater 200 in which the lead wires protrude from the respective heater end portions can be used as a type of heat source that is inserted, in a penetrating manner, from one furnace wall of the melting furnace to the other furnace wall opposite the one wall.

Hereinabove, the configuration and features of the heater according to the embodiment of the present invention have been described with reference to the first heater 100 to the third heater 300. However, it should be noted that this is merely an example, and a person skilled in the art can conceive of various configurations of heaters by referring to the above explanation.

For example, the third heater 300 as illustrated in FIG. 5 may use conductive heat-resistant materials 290A and 290B as illustrated in FIG. 3. In the third heater 300 as illustrated in FIG. 5, an electrically insulating member may be provided between the conductive heat-resistant material and the tubular member 330. In addition, various foams can be conceived of as heaters according to the embodiment of the present invention.

(Manufacturing Apparatus for Manufacturing Glass Product According to the Embodiment of the Present Invention)

Hereinafter, a configuration of a manufacturing apparatus for manufacturing a glass product according to the embodiment of the present invention is explained with reference to FIG. 7.

Figure 7:
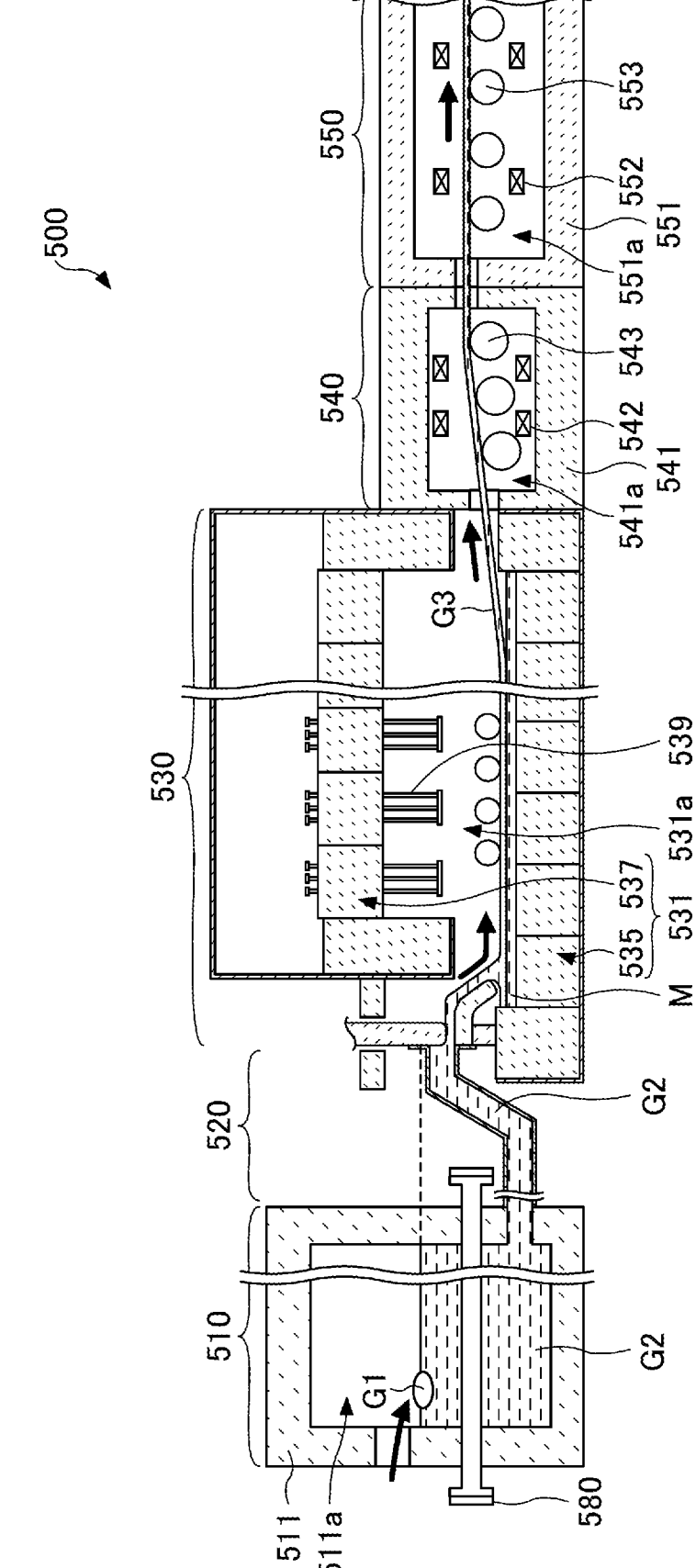
FIG. 7 is a cross sectional view schematically illustrating an example of configuration of a manufacturing apparatus for manufacturing a glass product according to an embodiment of the present invention.

FIG. 7 schematically illustrates an example of configuration of a manufacturing apparatus for manufacturing a glass product (hereinafter referred to as a "first manufacturing apparatus") 500 according to the embodiment of the present invention.

As illustrated in FIG. 7, the first manufacturing apparatus 500 includes a melting unit 510, a conveying unit 520, a forming unit 530, a connection unit 540, and an annealing unit 550.

The melting unit 510 is a zone for melting a glass material G1 to form molten glass G2.

The melting unit 510 includes a melting furnace 511 for partitioning a melting chamber 511*a*. Although not illustrated in the figure, one or more burners may be provided in an upper portion of the melting chamber 511*a*.

The conveying unit 520 is a zone for conveying the molten glass G2 formed by the melting unit 510 to the forming unit 530.

The forming unit 530 is a zone for forming the molten glass G2 carried from the conveying unit 520 into a belt-shaped glass ribbon G3.

The forming unit 530 includes a forming furnace 531. The forming furnace 531 includes a forming chamber 531*a* for forming the molten glass G2. The forming furnace 531 includes a float bath 535 and a ceiling 537 provided in an upper portion of the float bath 535. The ceiling 537 is provided with multiple ceiling heaters 539.

The float bath 535 contains molten metal M. The molten metal M is, for example, molten tin and the like. However, in addition to molten tin, a molten tin alloy and the like can also be used.

In order to suppress the oxidation of the molten metal M, the foaming chamber 531*a* is filled with reducing gas. For example, the reducing gas is composed of a mixed gas of hydrogen gas and nitrogen gas.

In the float bath 535, the molten glass G2 provided onto the molten metal M is formed into the belt-shaped glass ribbon G3 by using the liquid surface of the molten metal M.

The glass ribbon G3 gradually solidifies as the glass ribbon G3 flows from the upstream to the downstream of the float bath 535, and is pulled up from the molten metal M at the downstream of the float bath 535.

The ceiling heaters 539 are provided at intervals along the flow direction of the glass ribbon G3 to adjust the temperature distribution in the flow direction of the glass ribbon G3. The ceiling heaters 539 are provided at intervals in the width direction of the glass ribbon G3 to adjust the temperature distribution in the width direction of the glass ribbon G3.

The connection unit 540 is a zone for connecting the foaming unit 530 and the annealing unit 550. The connection unit 540 includes a connection furnace 541, intermediate heaters 542, and a lift out roll 543.

The connection furnace 541 includes a connection chamber 541*a* for conveying the glass ribbon G3. The multiple intermediate heaters 542 are provided in the connection chamber 541*a*.

The intermediate heaters 542 are provided at intervals along the flow direction of the glass ribbon G3 to adjust the temperature distribution in the conveying direction of the glass ribbon G3. The intermediate heaters 542 may be divided in the width direction of the glass ribbon G3 to adjust the temperature distribution in the width direction of the glass ribbon G3.

The lift out roll 543 is rotationally driven by a motor or the like to lift the glass ribbon G3 famed by the forming unit 530 and convey the glass ribbon G3 to the annealing unit 550.

The annealing unit 550 is a zone for annealing the glass ribbon G3 conveyed from the connection unit 540.

The annealing unit 550 includes an annealing furnace 551. The annealing furnace 551 forms an annealing chamber 551a for annealing the glass ribbon G3. The annealing chamber 551a is provided with multiple annealing heaters 552 and multiple annealing rolls 553. The annealing chamber 551a is configured so that the temperature gradually decreases from the inlet of the annealing furnace 551 to the outlet of the annealing furnace 551.

The annealing heaters 552 are provided at intervals along the conveying direction of the glass ribbon G3 to adjust the temperature distribution in the conveying direction of the glass ribbon G3. The annealing heaters 552 may be divided in the width direction of the glass ribbon G3 to adjust the temperature distribution in the width direction of the glass ribbon G3.

The annealing rolls 553 are rotationally driven by a motor or the like to convey the glass ribbon G3 from the entrance of the annealing furnace 551 to the exit of the annealing furnace 551. The annealing rolls 553 are provided at intervals along the conveying direction of the glass ribbon G3.

Herein, in the first manufacturing apparatus 500, the melting unit 510 is provided with the heater according to the embodiment of the present invention.

For example, in the example as illustrated in FIG. 7, a heater 580 according to the embodiment of the present invention is provided in the melting furnace 511. In FIG. 7, the heater 580 is illustrated in a simplified manner, and lead wires and the like are not illustrated.

The heater 580 is arranged horizontally so as to penetrate through the melting furnace 511. For example, the heater 580 may be the first and second heaters 100 and 200 as illustrated in FIG. 1 and FIG. 3.

Alternatively, the heater 580 may be the third heater 300 as illustrated in FIG. 5. In this case, the heater 580 may be installed vertically by being inserted from the floor below the melting furnace or from above the melting furnace or may be installed horizontally by being inserted from one of the furnace walls, so that one end of the heater 580 is exposed to the molten glass G2.

Although not clear in FIG. 7, normally, multiple heaters 580 are installed. For example, the multiple heaters 580 may be installed at intervals at the same height level in the melting furnace 511. In addition to this, or separately from this, the multiple heaters 580 may be installed at different height levels in the melting furnace 511. Hereinafter, the operation of the first manufacturing apparatus 500 having the above configuration is explained.

First, the glass material G1 is supplied to the melting unit 510. The glass material G1 is supplied to the melting chamber 511a of the melting furnace 511.

The glass material G1 is melted by heat applied from the heater 580, and the molten glass G2 is formed.

Herein, the heater according to the embodiment of the present invention is used as the heater 580. Therefore, in the melting unit 510, it is not necessary to use a large-scale device, and the size of the melting unit can be reduced. In addition, the heater 580 can melt, for example, the glass material G1 and heat the molten glass G2 to a high temperature higher than 1500 degrees Celsius.

Hereinafter, the molten glass G2 of the melting unit 510 is supplied to the forming unit 530 via the conveying unit 520.

The molten glass G2 supplied to the forming unit 530 continuously moves on the molten metal M. As a result, the belt-shaped glass ribbon G3 is formed from the molten glass G2. The glass ribbon G3 gradually solidifies as the glass ribbon G3 flows from upstream to the downstream of the float bath 535.

Hereinafter, the glass ribbon G3 is provided via the connection unit 540 to the annealing unit 550.

The annealing unit 550 is configured so that the temperature gradually decreases from the upstream to the downstream of the annealing chamber 551a. Accordingly, the temperature of the glass ribbon G3 gradually decreases as the glass ribbon G3 is conveyed in the annealing chamber 551a.

Thereafter, when the temperature of the glass ribbon G3 drops to a predetermined temperature, the glass ribbon G3 is cut into a predetermined size by a cutting machine.

As a result, a glass product is manufactured.

Hereinabove, the structure and operation of a manufacturing apparatus for manufacturing a glass product according to the embodiment of the present invention have been described with reference to the first manufacturing apparatus 500 as an example.

However, these are merely examples, and the manufacturing apparatus for manufacturing a glass product according to the embodiment of the present invention may have other configurations as long as the manufacturing apparatus includes the heater according to the embodiment of the present invention.

For example, in the first manufacturing apparatus 500, the heater according to the embodiment of the present invention is installed in the melting unit 510.

However, in addition to this, or separately from this, the heater according to the embodiment of the present invention may be provided in the conveying unit 520.

Also, in the first manufacturing apparatus 500, a zone including an additional member, such as a refining furnace for removing bubbles contained in the molten glass G2 and/or a stirring furnace for homogenizing the molten glass G2, may be provided between the melting unit 510 and the conveying unit 520. The heater according to the embodiment of the present invention may be provided in such a refining furnace and/or such a stirring furnace.

Further, in the first manufacturing apparatus 500, at least one of the conveying unit 520 and the connection unit 540 may be omitted. In this case, the molten glass G2 formed by the melting unit 510 may be directly discharged to the foaming unit 530, and/or the glass ribbon G3 formed by the forming unit 530 may be directly conveyed to the annealing unit 550.

A person skilled in the art can conceive of various kinds of changes other than those explained above.

(Manufacturing Method for Manufacturing Glass Product According to the Embodiment of the Present Invention)

Hereinafter, a method for manufacturing a glass product according to the embodiment of the present invention will be explained with reference to FIG. 8.

Figure 8:
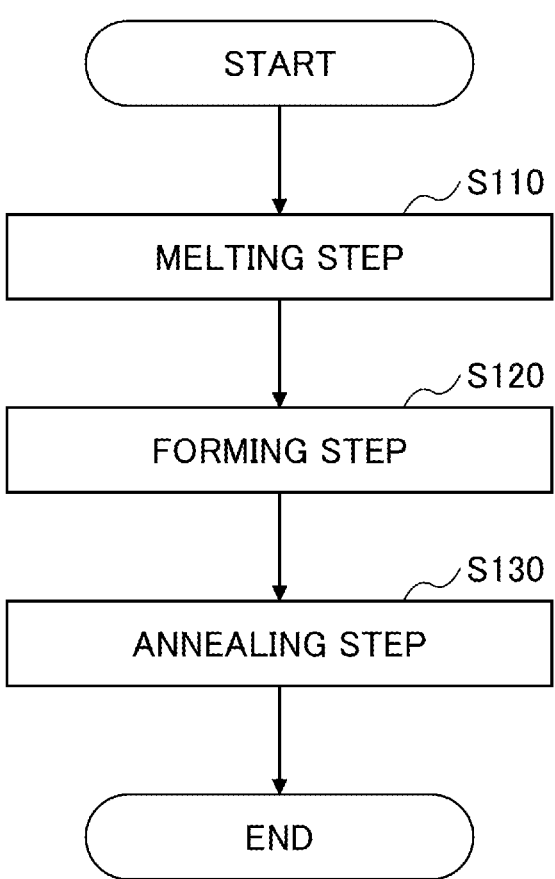
FIG. 8 is a flow diagram schematically illustrating an example of a manufacturing method for manufacturing a glass product according to an embodiment of the present invention.

As illustrated in FIG. 8, the method for manufacturing a glass product according to the embodiment of the present invention (hereinafter referred to as a "first manufacturing method") includes:

a melting step (step S110) for melting a glass material to form a molten glass;

a forming step (step S120) for foiling the molten glass; and an annealing step (step S130) for annealing the formed glass.

However, the annealing step is not always a necessary step in the first manufacturing method and may be omitted.

Hereinafter, each step will be explained.

(Step S110)

First, a glass material is supplied to the melting furnace, in which the glass material is melted.

The melting furnace may have a configuration similar to the melting furnace 511 of the first manufacturing apparatus 500 explained above.

The heater according to the embodiment of the present invention may be installed in the melting furnace. In this case, the glass material is heated by the heater according to the embodiment of the present invention and becomes molten glass.

The glass material is not particularly limited. However, it should be noted that, in a case where the heater according to the embodiment of the present invention is installed in the melting furnace, the molten glass obtained by melting the glass material can be heated to a high temperature of more than, for example, 1500 degrees Celsius. Specifically, in the first manufacturing method, a glass material having a high melting point can be used.

The molten glass melted in the melting furnace is conveyed to the forming furnace.

During the conveyance, the molten glass may be discharged from the melting furnace into the conveying unit, and the molten glass may be supplied to the forming furnace from the conveying unit. For example, another apparatus (hereinafter referred to as "additional apparatus") such as a refining furnace may be provided between the melting furnace and the conveying unit. Alternatively, the molten glass may be directly provided from the melting furnace to the forming furnace.

In a case where the molten glass is conveyed to the conveying unit before being supplied to the forming furnace, the conveying unit may be provided with the heater according to the embodiment of the present invention. In a case where the molten glass is supplied to the additional apparatus before being supplied to the forming furnace, the additional apparatus may be provided with the heater according to the embodiment of the present invention.

In other words, the heater according to the embodiment of the present invention may be provided at any position between the melting furnace and the conveying unit.

(Step S120)

Hereinafter, the molten glass conveyed to the forming furnace is formed.

The forming process is not particularly limited. For example, the molten glass may be formed by a conventional foaming process such as a float process, a downdraw process, a roll out process, or a fusion process.

Among them, in a case where the molten glass is formed by the float process, the forming unit 530 of the first manufacturing apparatus 500 as illustrated in FIG. 7 may be used. For example, a glass ribbon may be formed by providing the molten glass onto the float bath of the foaming furnace and conveying the molten glass from the upstream to the downstream.

(Step S130)

Thereafter, if necessary, the formed glass is cooled to a room temperature. Also, if necessary, the formed glass is cut into a predetermined shape.

The formed glass product can be manufactured according to the steps described above.

In the first manufacturing method, the heater according to the embodiment of the present invention may be used in any given step between the melting step (step S110) and the foaming step (step S120) (however, the any given step does not include the forming step itself).

In the first manufacturing method, the heater according to the embodiment of the present invention is used to heat the molten glass. Therefore, in the first manufacturing method, even if the temperature of the molten glass exceeds a temperature of, for example, 1500 degrees Celsius, the molten glass can be heated stably.

What is claimed is:

1. A heater comprising:

a heat generating member being conductive and configured to radiate heat rays by being fed with electric power; and a tubular member composed of a metal and accommodating the heat generating member, wherein the heat generating member is composed of a material containing carbon at 80% or more by mass, the tubular member is composed of a material including one or more selected from platinum, rhodium, tungsten, iridium, and molybdenum, an insulating material is not provided between the heat generating member and the tubular member, and the heat generating member is not in contact with the tubular member.

2. The heater according to claim 1, further comprising:

a lead wire extending from an inside of the tubular member and electrically connected to the heat generating member, wherein a conductive heat-resistant material is provided between the heat generating member and the lead wire.

3. The heater according to claim 2, wherein an insulating member is provided around the conductive heat-resistant material.

* * * * *